United States Patent [19]

Luechinger et al.

[11] Patent Number: 5,264,667
[45] Date of Patent: Nov. 23, 1993

[54] WEIGHING APPARATUS HAVING IMPROVED WINDSCREEN MEANS

[75] Inventors: Paul Luechinger, Uster; Eduard Fringeli, Bubikon, both of Switzerland

[73] Assignee: Mettler-Toledo AG, Greifensee, Switzerland

[21] Appl. No.: 964,017

[22] Filed: Oct. 21, 1992

[30] Foreign Application Priority Data

Dec. 17, 1991 [CH] Switzerland ............ 3732/91

[51] Int. Cl.⁵ .................................. G01G 21/28
[52] U.S. Cl. ............................ 177/180; 177/124; 177/181; 177/238
[58] Field of Search .......... 177/180, 181, 238, 124

[56] References Cited

U.S. PATENT DOCUMENTS

| | | | |
|---|---|---|---|
| 1,151,788 | 8/1915 | Holz | 177/180 |
| 4,664,207 | 5/1987 | Knothe et al. | 177/181 |
| 4,700,793 | 10/1987 | Lüchinger | 177/181 |
| 4,798,250 | 1/1989 | Knothe et al. | 177/181 |
| 4,979,579 | 12/1990 | Dardat et al. | 177/180 |
| 5,058,692 | 10/1991 | Melcher et al. | 177/181 |
| 5,074,369 | 12/1991 | Strickler | 177/180 |
| 5,170,855 | 12/1992 | Kunz et al. | 177/181 |

FOREIGN PATENT DOCUMENTS 9004029.5 8/1990 Fed. Rep. of Germany.

Primary Examiner—Benjamin R. Fuller
Assistant Examiner—Randy W. Gibson
Attorney, Agent, or Firm—Laubscher & Laubscher

[57] ABSTRACT

A weighing scale housing (9) includes a base (21), vertical front (19), rear (17), and side (23,25) walls cooperating with the base to define a weighing chamber (3) containing a movable weighing pan (5), characterized in that at least one of the side walls includes a plurality of planar side wall segments (27, 29; 31, 33) arranged at an obtuse angle, the one side wall being mounted for movement along an arcuate path between an open position affording access to the weighing pan, and a closed position closing the weighing chamber. When in the open position, the side wall is adjacent the rear wall, and when in the closed position, the forward vertical edge (51,53) of one segment engages the rear surface of the front wall, and the rear vertical edge portion (55, 57) of the other segment engages an end portion of the rear wall, thereby tightly sealing the weighing chamber.

13 Claims, 3 Drawing Sheets

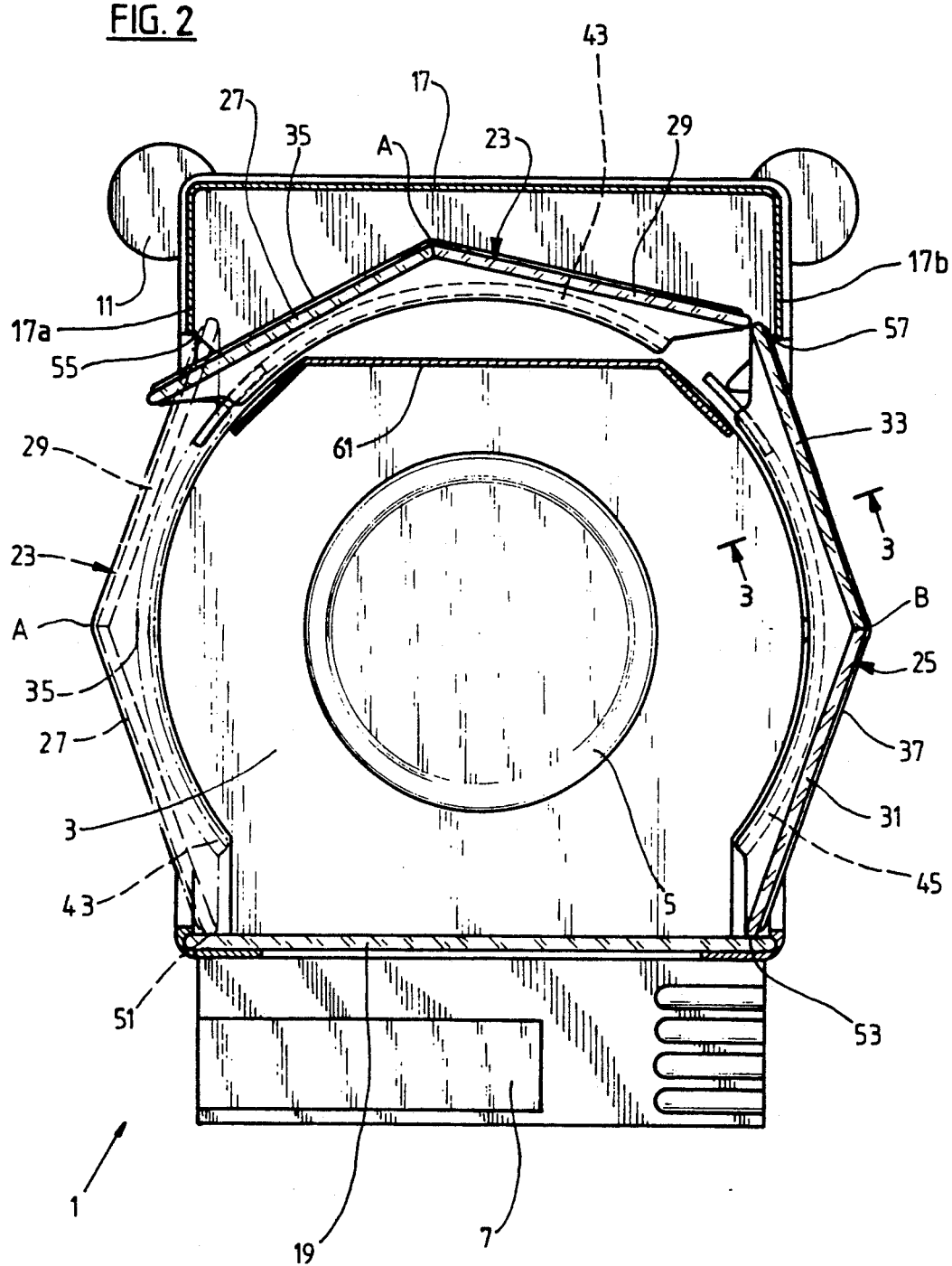

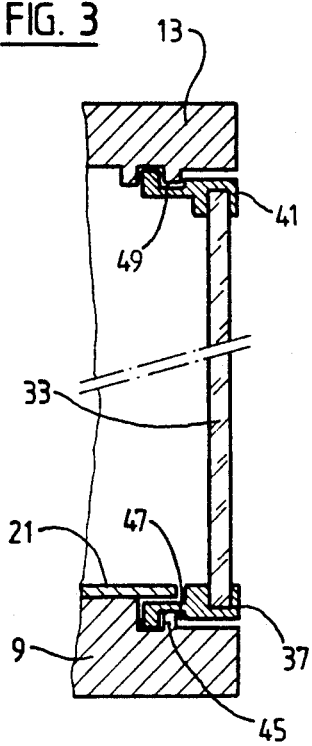
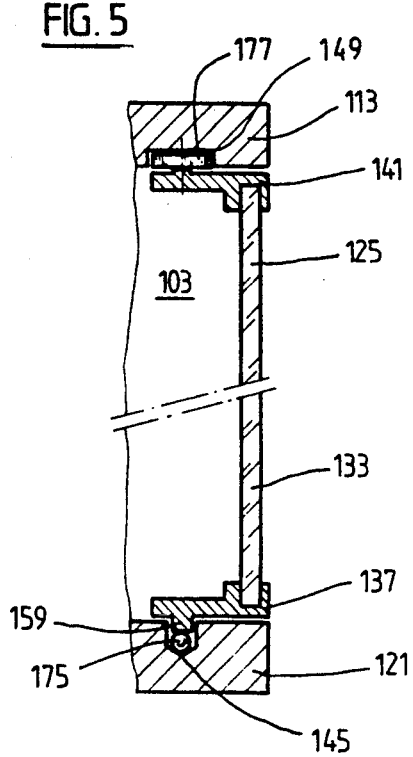
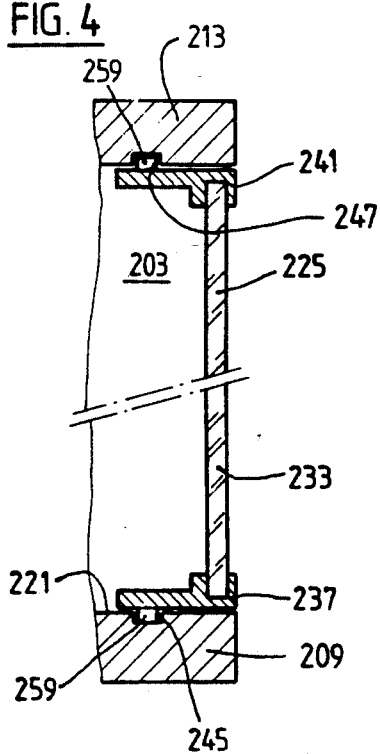
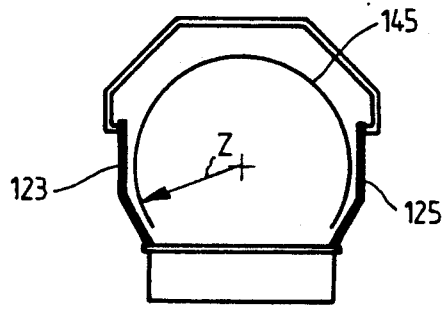
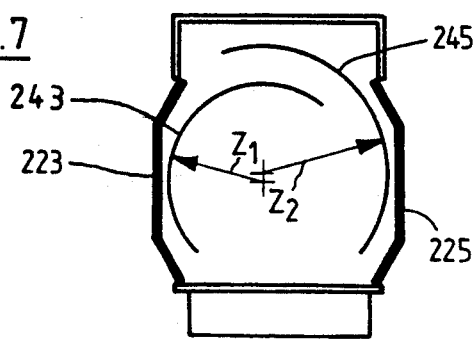

WEIGHING APPARATUS HAVING IMPROVED WINDSCREEN MEANS

STATEMENT OF THE INVENTION

A weighing scale of the windscreen type includes a housing having a base, and vertical wall means cooperating with the base to define a weighing chamber containing a movable scale pan, said vertical wall means including at least one planar side wall that is displaceable along an arcuate path between closed and open positions relative to said chamber.

BRIEF DESCRIPTION OF THE PRIOR ART

It is well known in the weighing scale art to provide windscreen means for defining a chamber to protect the weighing pan from the adverse effects of ambient wind forces that otherwise would cause errors in the weighing operations. One example of such windscreen means is shown in the U.S. Pat. No. 4,798,250, wherein the windscreen means includes a pair of side walls that are segments of a cylinder. The top of the weighing chamber defined by the wall elements is closed by lid elements that are the segments of a circular disk. The wall members have different diameters and are movably supported by circular guide means on the base portion of the scale housing, thereby to permit either or both of the wall elements to be displaced to open positions adjacent each other to afford access to the weighing chamber. To prevent the flow of air into the weighing chamber, sealing means are provided along the edges of at least one of the movable wall elements. This known wind screen possesses certain drawbacks that hinder scale operation. For example, the unavoidable reflection of light along the cylindrical glass surfaces often restricts clear observation of the material being weighed. Moreover, owing to the frictional resistance provided by the sealing means the mutual rotation of the two elements may be effected only upon the application of substantial force. As a result of the vapors and the like that are often present in laboratory rooms, the seals become damaged and ineffective after a short period of use, and every time the weighing chamber is opened, the seals produce smearing of the glass surfaces and thus further hinder the observation of the weighing operation. The lid elements connected with the wall segments further hinder movement of the wall segments between the open and closed positions, and it is impossible to open the lid elements to obtain access to the weighing chamber without first displacing a wall segment. A further drawback is that the curved wall segments are difficult to manufacture, and are thus expensive to produce.

As shown by the U.S. Pat. No. 4,664,207, it is also known to provide wind screen devices having planar walls, wherein both the side walls and the associated lid segments are arranged on guide tracks for rearward displacement relative to the housing. The part of the side that is displaced to the rear protrudes over the rear side of the scale housing and thus requires that the user leave a certain amount of space behind the scale housing. Furthermore, it is difficult to provide perfect guidance of flat side walls having a substantial height relative to the forward surface of the base, while at the same time preventing wedging of the guide rails.

The present invention was developed to avoid the above and other drawbacks of the known weighing scales of the windscreen type, while at the same time providing clear observation of the weighing operation, and simple handling of the material to be weighed.

SUMMARY OF THE INVENTION

Accordingly, a primary object of the present invention is to provide improved windscreen means for a weighing scale, wherein at least one of the side walls of the windscreen includes at least two planar wall panels arranged at an obtuse angle and joined along a common edge to define an apex, said one side wall being supported between upper and lower frame members that are guided for movement along arcuate tracks connected with the housing, thereby to permit displacement of the side wall along an arcuate path between open and closed positions relative to the weighing chamber.

As a consequence of the use of flat wall elements —which are preferably but not necessarily identical— guided by arcuate track means, a weighing scale is provided having a minimum housing base surface that may be manufactured at a reasonable cost.

According to a more specific object of the invention, the forward and rear edges of the movable side wall, when in the closed position, are in tight sealing contact with the stationary front and rear housing walls, thereby to tightly close the weighing chamber with respect to dust and air currents that might be present in the laboratory room in which the weighing apparatus is used. Owing to the arcuate configuration of the guide tracks, the movable walls may be stored in a small space at the rear of the scale housing. An intermediate wall may be provided for protecting the side walls—when in the retracted position—against contamination (for example, by liquid sprayed into the weighing chamber, or by contact with a dosing spoon).

According to another object, the arcuate guide means include pins which serve as the guide elements, whereby the arcuate tracks may have any desired shape, or even different diameters, respectively. Ball bearing or roller means may be included in the arcuate guide means, thereby to reduce friction, and it is thus possible to shift the walls by means of low-power micro-motors that develop only a small amount of heat that otherwise would have a deleterious effect on the weighing operation.

In the event that the side walls have more than two planar elements, the use of transparent panels of different sizes and arranged at different angles is possible. This, on the one hand, affords a certain degree of flexibility in the design of the weighing chamber in keeping with the user's needs, and, on the other hand, affords the advantage of small storage space when the movable side walls are open.

BRIEF DESCRIPTION OF THE DRAWING

Other objects and advantages of the invention will become apparent from a study of the following specification when viewed in the light of the accompanying drawing, in which:

FIG. 2 is a horizontal sectional view of the apparatus taken along line 2—2 of FIG. 1;

FIG. 3 is a sectional view taken along line 3—3 of FIG. 2;

FIGS. 4 and 5 illustrate two alternate embodiments of the guide means of FIG. 3; and FIGS. 6 and 7 are diagrammatic views illustrating the configuration of two arcuate track guide means.

DETAILED DESCRIPTION

Figure 1:
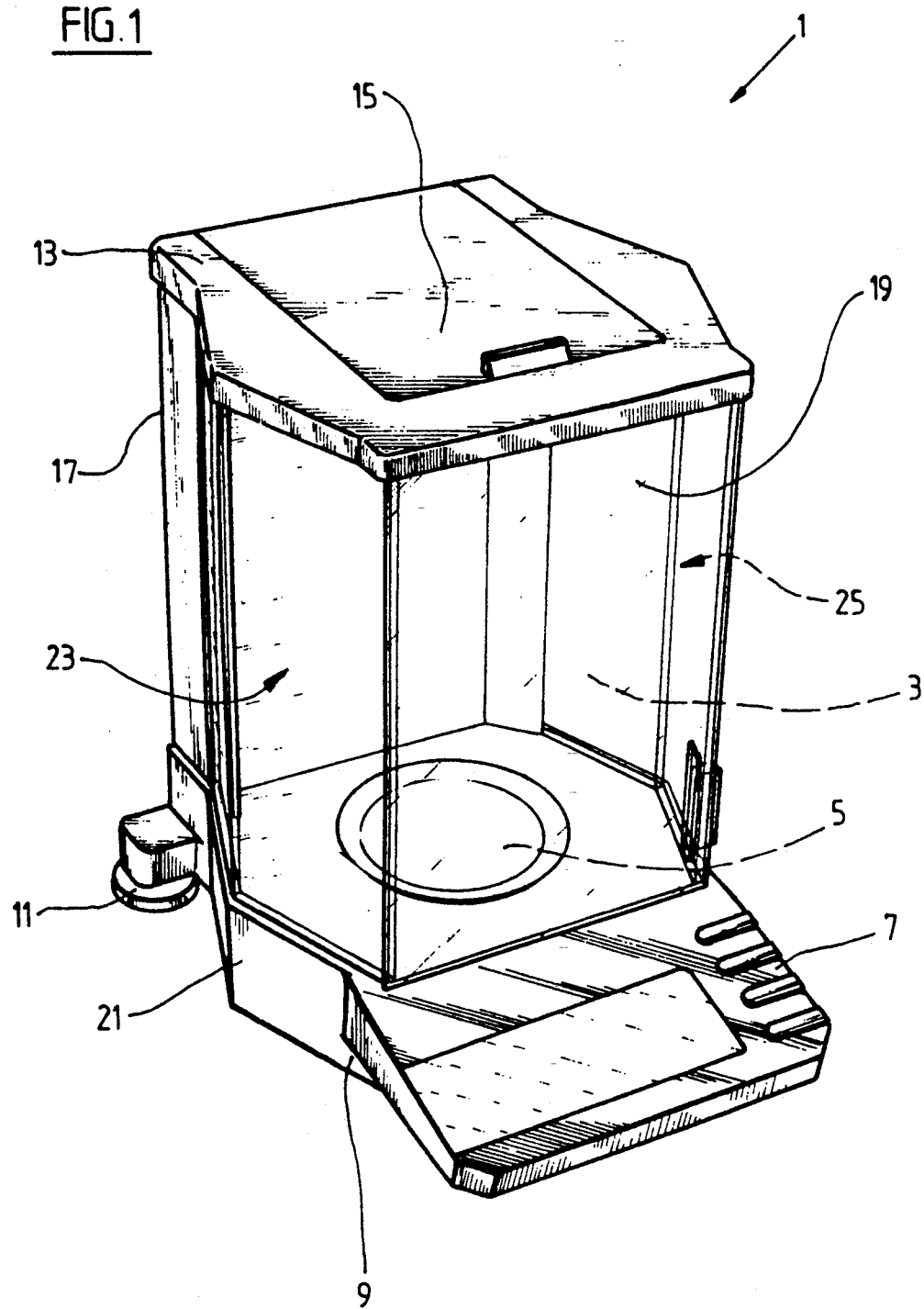
FIG. 1 is a front perspective view of the weighing scale of the present invention.

Referring first more particularly to FIGS. 1 and 2, the weighing scale apparatus 1 includes a housing 9 having a base portion 21, vertical rear and front walls 17 and 19, respectively, a pair of side walls 23 and 25, respectively, and a top wall 13 containing a lid 15 that is pivotable at its rear end about a horizontal pivot axis. The lid 15 may be pivoted from its illustrated closed position to an open position, thereby to afford access to the weighing chamber 3 defined by the front side and rear walls, which weighing chamber contains a weighing pan 5 that is mounted for movement relative to the housing base 21. Three leveling feet 11 are provided for leveling the housing, as is known in the art. The housing base portion also includes a keyboard 7 having a display, as is known in the art. In accordance with a characterizing feature of the invention, the side walls 23 and 25 each include a pair of planar sections 27, 29 and 31, 33 arranged at an obtuse angle with the apices A and B, respectively.

As shown in FIG. 3, the planar wall elements 31 and 33 of the side wall 25 are supported by lower and upper frame members 37 and 41 that contain arcuate grooves for receiving arcuate guide tracks 45 and 49, respectively, contained in the base portion 21 of the housing 9 and in the cover portion 13, respectively. (Similarly, the sidewall 23 includes lower and upper frame members 35 and 39 for supporting the obliquely arranged panels 27 and 29.) Thus, the guide frame 37 contains a groove 47 for receiving guide track 45, and guide frame 41 contains a groove 48 for receiving guide track 49, thereby to guide the sidewall 25 for arcuate movement between the closed position shown in solid lines in FIG. 2, and an open position corresponding with the position of sidewall 23 illustrated by solid lines, thereby affording lateral access to the weighing chamber 3. Similarly, side wall 23 is movable along arcuate track 43 between the open position shown in solid lines, and the closed position 23' illustrated in phantom.

As shown in FIG. 2, the rear wall 17 has a generally U-shaped configuration with a pair of leg portions 17a and 17b that extend toward the front wall. When the side wall 23 is displaced counterclockwise from the open position to the closed position illustrated in phantom, the forward edge 51 of the wall section 27 engages the rear surface of the front plate 17, and the rear edge portion 55 of the side wall segment 29 engages the extremity of the leg portion 17a of rear wall 17, thereby to tightly seal the weighing chamber 3. Similarly, when the side wall 25 is in its illustrated closed position, the forward edge portion 53 engages the rear surface of the front wall 19, and the rear edge portion 57 of wall segment 33 engages the extremity of leg portion 17b of the rear wall 17.

Preferably, the front wall 19 and the side wall segments 27, 29, 31, and 33 are formed of a suitable transparent material, such as glass. The electronic and mechanical weighing components of the scale are contained in the housing base portion 21 below the weighing chamber 3, as is known in the art. The front wall 19 and the rear wall 17 are stationary and are fastened to the housing base portion 21 and the top wall 13, respectively.

Instead of having arcuate guide tracks 45 and 49 cooperating with corresponding grooves 47 and 48 contained in the frame members 37 and 41, respectively, the frame members 237 and 241 may be provided with pins 259 that extend within corresponding grooves 245 and 247 contained in the base portion 209 and the cover portion 213 of the housing, as shown in FIG. 4.

As shown in FIG. 5, the groove 145 may be provided with ball bearing means 175 that support the arcuate rib 159 of the lower guide frame 137. Similarly, the upper guide frame 141 may be provided with a plurality of guide rollers 177 that rotate about vertical axes and cooperate with the walls of a corresponding arcuate groove 149. The balls 175 shown in FIG. 5 may be caged in a suitable frame (not shown), and the bottom walls of the guide groove 145 may be flat, V-shaped or arcuate in cross section.

As shown in FIG. 2, the housing may also include an intermediate vertical wall 61 spaced inwardly from the rear wall 17, thereby to define a chamber for receiving either of the side walls 23 or 25 when arcuately displaced from the closed position toward the open position relative to the housing chamber 3. Thus, the intermediate wall 61 protects the side wall, when in the open position, against contaminating fluids or the like that enter the weighing chamber 3.

Owing to the cooperation of the front edges 51 and 53 of the side walls 23 and 25 with the rear surface of the front wall 19, and the cooperation between the rear edge portions 55 and 57 of the side walls 23 and 25 with the extremities of the rear wall leg portions 17a and 17b, respectively, the weighing chamber 3 is closed in a dust-proof and wind-proof manner, whereby the use of sealing lips or brushes may be avoided.

Referring now to FIGS. 6 and 7, the arcuate guide track 145 may have the configuration of the segment of a circle, as shown in FIG. 6, whereas in FIG. 7, the guide tracks 243 and 245 for the side walls 223 and 225 may have unequal radii $Z_1$ and $Z_2$ respectively. In both designs, the guide tracks extend adjacent the rear wall 17. In the case of the FIG. 7 embodiments, the guide tracks overlap in the vicinity of the rear wall of the housing, and thus, the two side walls 223 and 225 could be opened at the same time.

The wall segments 27, 29 and 31, 33 are preferably adhesively secured (for example, by gluing) within the corresponding grooves contained in the guide frames 35, 37 and 39, 41.

As indicated above, the side wall 23 may be arcuately displaced in the clockwise direction from the closed position illustrated in phantom in FIG. 2 to the open position illustrated by the solid lines in FIG. 2. The wall may be moved either manually or by electrical drive means, not shown. The portion of wall surface 33 that rests against the extremity of rear wall leg portion 17b extends away from the rear wall 17 in the direction toward center Z because the middle area of side wall 25 is closer to rotation axis Z than all other vertical edges of the two wall segments 31 and 33. The angle between the two wall segments 31 and 33, or 27 and 29, is obtuse and so dimensioned that the connecting points B or A can slide unhindered past the extremities 57 and 55 of the legs of the rear wall 17.

While in accordance with the provisions of the patent statutes, the preferred forms and embodiments of the invention have been illustrated and described, it is apparent that various changes and modifications may be made without deviating from the inventive concepts set forth above. Thus, it is possible that the housing top wall may be omitted, thereby affording an open-topped weighing chamber. Furthermore, if desired, each side wall may consist of a single planar segment, rather than of a plurality of segments as described above.

What is claimed is:

1. In a weighing scale (1) including a housing (9) having a base (21), vertical wall means cooperating with said base to define a weighing chamber (3), and a movable weighing pan (5) arranged in said weighing chamber for movement relative to said base; the improvement wherein said vertical wall means comprises:
   (a) a plurality of side walls (23,25) each including at least one planar segment (27, 29; 31, 33);
   (b) support means for (35, 37) supporting at least lower ends of said side walls relative to said base; and
   (c) arcuate guide means (43, 45) connecting at least one of said support means for movement along an arcuate path between chamber-closed and chamber-open positions relative to said base, thereby to effect displacement of a side wall associated with said one support means relative to said base from a closed position to an open position affording lateral access to said weighing chamber.

2. Apparatus as defined in claim 1, wherein each of said side walls includes a plurality of generally planar segments (27, 29; 31, 33) arranged at an obtuse angle relative to each other and partially enclosing said weighing chamber, said segments being joined by respective apices (A,B) that are vertical and parallel.

3. Apparatus as defined in claim 1, wherein said housing includes also a horizontal top wall (13); and further wherein said support means includes upper (39,41) and lower (35,37) frame means for supporting upper ends and said lower ends of said side walls, said arcuate guide, means (45,49) connecting the lower and upper frame means of said movable side wall with said housing base and with said top wall, respectively, for movement along an arcuate path between said open and closed positions relative to said housing.

4. Apparatus as defined in claim 3, wherein said vertical wall means includes also a pair of stationary parallel spaced front (19) and rear (17) walls, remote vertical edge portions (51,55; 53,57) of segments of said movable side wall being in tight engagement with front wall and a rear wall when said movable side wall is in said closed position, thereby to tightly close said weighing chamber.

5. Apparatus as defined in claim 4, wherein said rear wall has a generally U-shaped configuration with leg portions (17a, 17b) thereof extending toward said front wall, a front edge of the forward segment of said movable wall being in engagement with a rear surface of said front wall when said movable side wall is in a closed position, the rear portion of the rear segment of said movable one wall being in engagement with an extremity of a corresponding leg of said rear wall when said movable side wall is in the closed position.

6. Apparatus as defined in claim 3, wherein said arcuate guide means comprises an arcuate groove (47,48; 245,247) contained in one of said housing and frame means for cooperation with at least one projection means (45,49; 259) carried by the other of said housing and frame means.

7. Apparatus as defined in claim 6, wherein said projection means comprises at least two guide pins (259).

8. Apparatus as defined in claim 6, wherein said projection means comprises an arcuate guide roller (177) having a vertical axis of rotation.

9. Apparatus as defined in claim 6, wherein said projection means comprises an arcuate guide rib (45, 49; 159).

10. Apparatus as defined in claim 6, and further including ball bearing means (175) arranged in said groove for supporting said projection means.

11. Apparatus as defined in claim 1, wherein said side walls are formed from a transparent material.

12. Apparatus as defined in claim 2, wherein the segments of each of said side walls are arranged at the same obtuse angle.

13. Apparatus as defined in claim 4, wherein said housing includes a vertical intermediate wall (61) generally parallel with and spaced inwardly from said rear wall, said rear and intermediate walls being so arranged on opposite sides of said arcuate guide means that the space therebetween at least partially receives said one side wall when said one side wall is in the open position.

* * * * *